Dec. 22, 1970    D. A. RICHARDSON ET AL    3,550,014
ELECTRONIC CONTROL APPARATUS HAVING IMPROVED TRANSFER MEANS
Original Filed Sept. 12, 1968    3 Sheets-Sheet 1
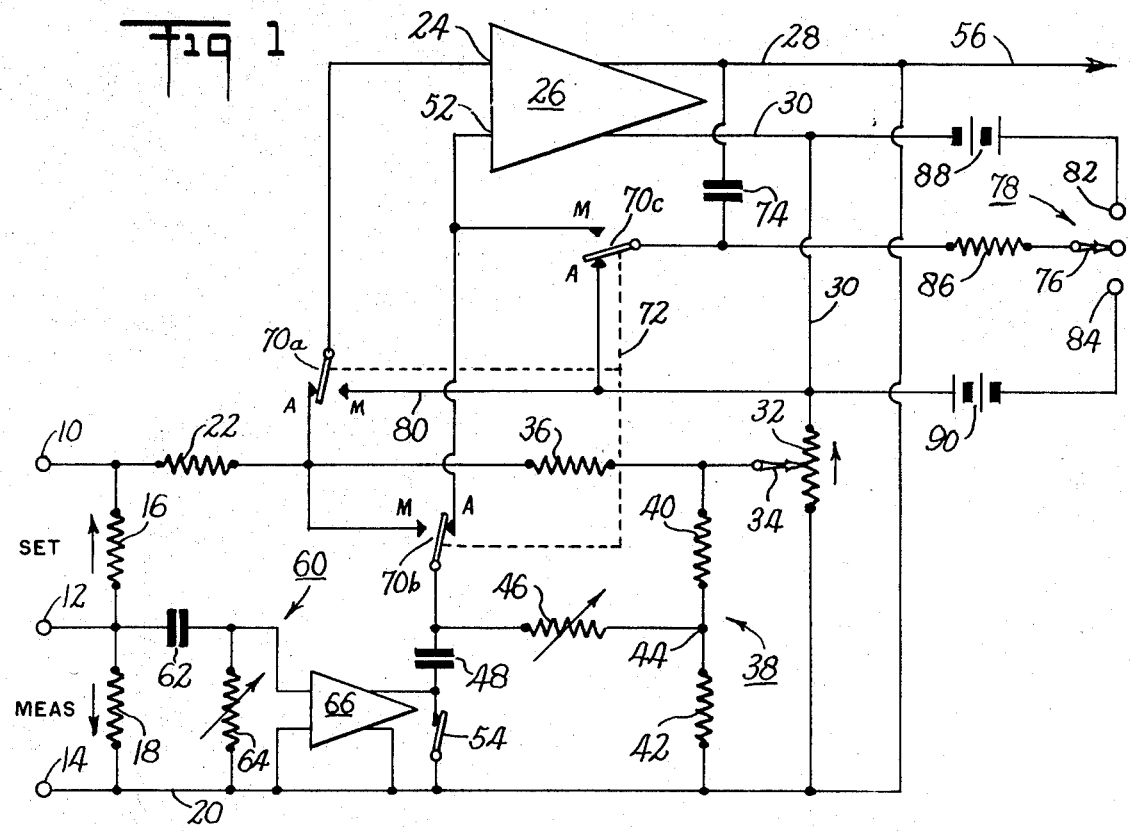
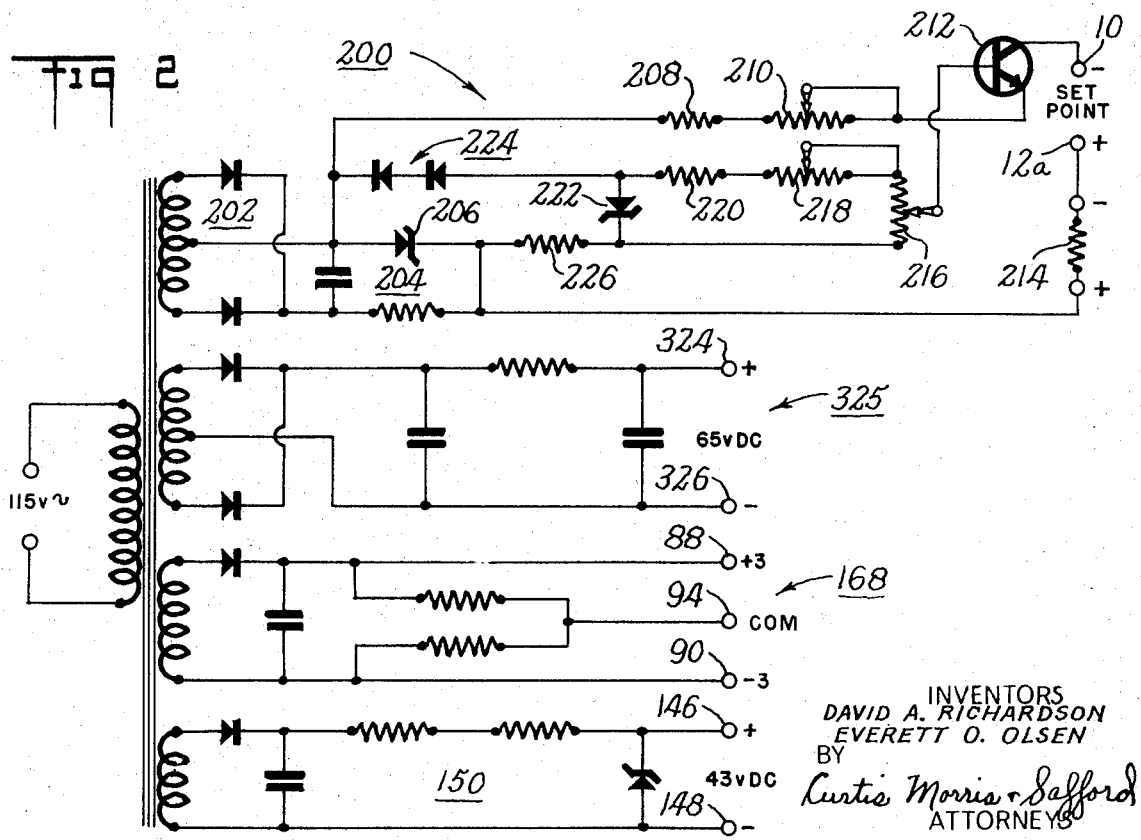
INVENTORS
DAVID A. RICHARDSON
EVERETT O. OLSEN
BY
Curtis, Morris & Safford
ATTORNEYS

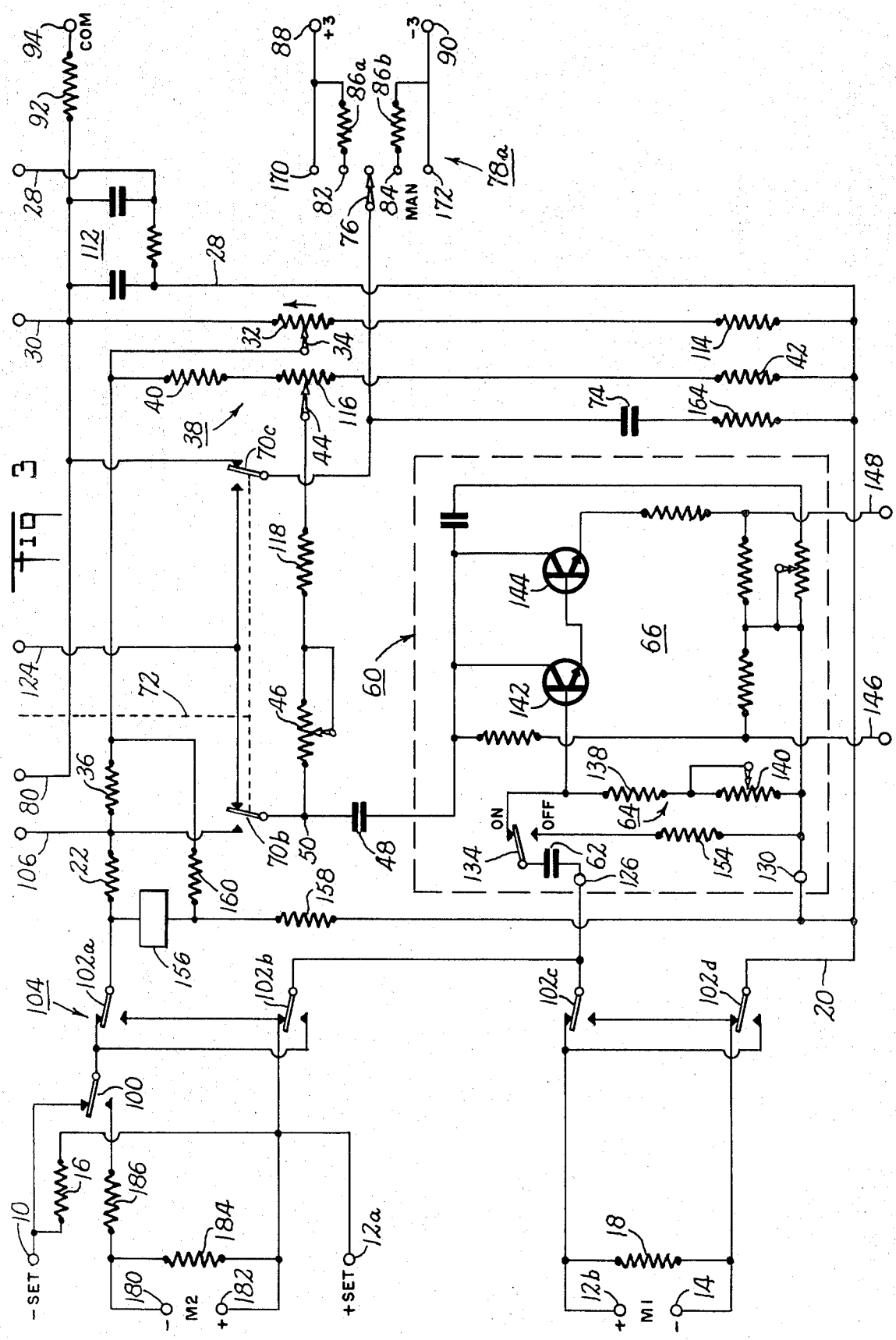

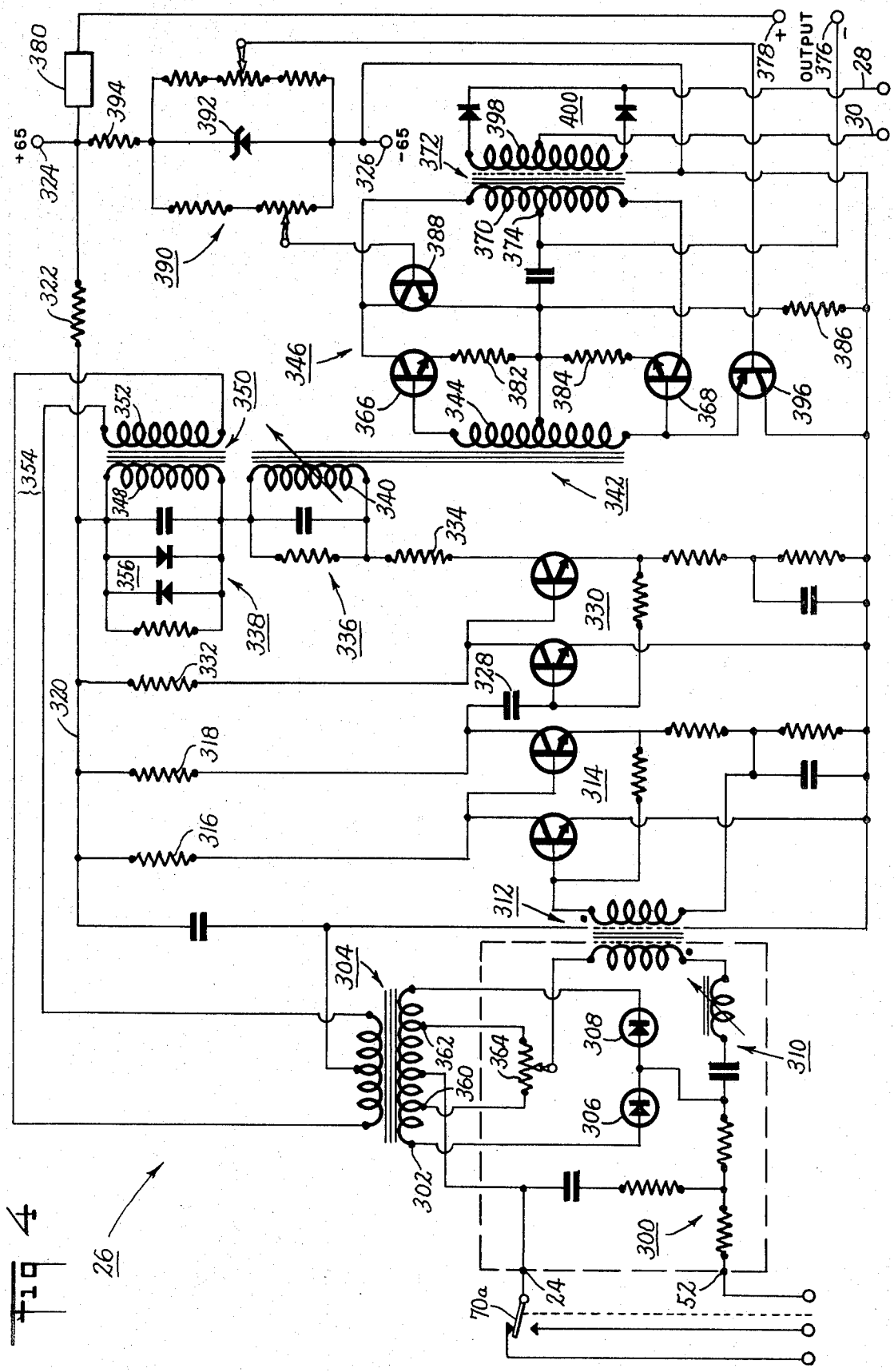

United States Patent Office 3,550,014
Patented Dec. 22, 1970

3,550,014
ELECTRONIC CONTROL APPARATUS HAVING IMPROVED TRANSFER MEANS
David A. Richardson, Sheldonville, and Everett O. Olsen, Wrentham, Mass., assignors to The Foxboro Company, Foxboro, Mass., a corporation of Massachusetts
Continuation of application Ser. No. 760,124, Sept. 12, 1968. This application Dec. 22, 1969, Ser. No. 882,785
Int. Cl. H03k 5/00; H03f 3/68
U.S. Cl. 328—1                          29 Claims

ABSTRACT OF THE DISCLOSURE

Electronic control apparatus of the type adapted to receive an electrical measurement signal and produce a corresponding electrical control signal for transmission to a process regulating device such as a valve or the like. A process controller is disclosed having means for switching directly between automatic and non-automatic conditions in either direction, and without upsetting the process.

---

This application is a continuation of Ser. No. 760,124 filed Sept. 12, 1968 which is a continuation of Ser. No. 507,780 filed Nov. 15, 1965.

This invention relates to control apparatus for use in regulating a variable condition of an industrial process. More particularly, this invention relates to electronic control apparatus of the type adapted to receive an electrical measurement signal and to produce a corresponding electrical control signal for transmission to a process regulating device such as a valve or the like.

Electronic process controllers of the so-called "analog" type have been available and in use commercially for a number of years. One particularly successful design is disclosed in U.S. Pat. No. 2,956,234 issued to E. O. Olsen on Oct. 11, 1960. An important advantage of such prior controllers is that they are constructed of modern "solid state" components comprising transistors and other elements made of semiconducting material, and thus not only provide excellent control characteristics but are able to operate reliably for long periods of time.

Although such controllers generally operate automatically to maintain a process condition at a desired level, there are times when it is necessary to switch the controller from automatic to non-automatic operation. For example, for various purposes it frequently is desired to control the process condition by means of a manually-adjustable signal, or by means of a signal derived from a remote source such as a computer. Devising suitable means for making the transfer from automatic to non-automatic operation, and back again, has represented a problem. For example, special arrangements must be provided for assuring that the transfer takes place without upsetting the process. Such so-called "bumpless" transfer can be accomplished by providing the transfer switch with a "balance" position in which certain readings can be taken and corresponding adjustments made to permit the transfer to be completed without process upset. However, such procedures are undesirable because they not only require undue time, but also permit operator errors with possibly harmful effects.

Various proposals have been made from time to time to solve this problem but these proposals either have not been fully practicable or have been limited in effectiveness. Accordingly, it is a principal object of this invention to provide process control apparatus having improved means for transferring between automatic and non-automatic conditions of operation. In an embodiment of this invention described hereinbelow, a process controller is disclosed having means for switching directly between automatic and non-automatic conditions, in either direction, and without upsetting the process. Other objects, aspects and advantages of this invention will in part be pointed out in, and in part apparent from, the following description considered together with the accompanying drawings, in which:

FIG. 1 is a simplified schematic diagram illustrating a process controller incorporating the transfer switch arrangement of the present invention;

FIG. 2 shows details of the power supply circuitry including the set point signal generating means; and FIGS. 3 and 4 together form a schematic diagram showing the details of the process controller of FIG. 1.

Referring now to the left-hand side of FIG. 1, there are shown three input terminals 10, 12 and 14 leading to two series-connected resistors 16 and 18. Through the circuit loop including terminals 10 and 12 and resistor 16 (500 ohms) flows a set point current of adjustable but normally fixed magnitude, for example in the range of 2 to 10 milliamps. Through the other circuit loop including terminals 12 and 14 and resistor 18 (100 ohms) flows a measurement current, e.g. in the range of 10 to 50 milliamps, and having a magnitude proportional to the value of the controlled process condition. These two currents are in opposite directions, as shown by the arrows, and thus the voltages produced across the resistors 16 and 18 are of opposite polarity.

The circuitry described thus far comprises comparison circuit means arranged to produce between terminals 10 and 14 a deviation signal having a magnitude proportional to the difference between the desired and actual values of the process condition, and having a polarity determined by whether the condition is above or below the desired value. When the measured process condition is exactly at its desired value, i.e. on "set point," the deviation signal will be zero. If the measurement current through resistor 18 changes, the potential of terminal 10 will change correspondingly with respect to that of terminal 14. Simply to provide a base of reference for the various circuit potentials in the controller, terminal 14 will be considered the "circuit ground," and the lead 20 connected thereto will be termed the "reference lead." If the set point current through resistor 16 is adjusted to its midvalue (6 milliamps), the deviation signal at terminal 10 can be at any potential from minus 2 volts to plus 2 volts with respect to reference lead 20, the exact value depending of course upon the measured process condition.

The deviation signal on terminal 10 is directed through an input resister 22 (100K) and section 70a of an automatic-to-manual transfer switch 72 to one input terminal 24 of a high-gain A-C amplifier generally indicated at 26. This amplifier, which will be described hereinbelow in detail, may for example have a forward gain of 2,000. The output leads 28 and 30 of this amplifier are connected respectively to the ends of a potentiometer 32 (600 ohms) the lower end of which also is connected to the reference lead 20. The movable arm 34 of potentiometer 32 defines an output terminal 34 providing a feedback voltage. This voltage is applied to the input end of a first feedback circuit comprising a series resistor 36 (100K), the remote end of which is connected to the amplifier input terminal 24. The direction of current flow is "up" through potentiometer 32, so that the potential of terminal 34 is negative with respect to the reference lead 20.

It will be observed that resistors 22 and 36 form a voltage divider having a 2:1 dividing ratio. Since the amplifier 26 requires essentially no current at its input circuit (as will be evident from the detailed description hereinbelow), the current through resistors 22 and 36 will be equal and thus the potential of the intermediate point between these resistors will be mid-way between the potentials at the ends. For example, if the deviation signal on terminal 10 is zero and potentiometer 32 is adjusted to provide a potential of −3 volts on terminal 34, the potential of the amplifier input terminal 24 will be minus 1.5 volts, i.e. halfway between the potentials of deviation terminal 10 and terminal 34.

Output terminal 34 also is connected to the reference lead 20 through a second voltage divider 38 consisting of two series resistors 40 and 42. The intermediate point 44 of this second voltage divider supplies a signal to one end of a reset feedback circuit comprising an adjustable series reset resistor 46 (e.g. 100M) followed by a shunt reset capacitor 48. The junction 50 between resistor 46 and capacitor 48 is connected through section 70b of transfer switch 72 to the second amplifier input terminal 52, and the other plate of capacitor 48 is shown connected through a closed switch 54 back to the reference lead 20. As will be evident from the more detailed description hereinbelow respecting FIGS. 3 and 4, the switch 54 is not actually necessary, but is shown in FIG. 1 to simplify the explanation.

The potential difference between the two amplifier input terminals 24 and 52 determines the magnitude of current flowing through output leads 28 and 30. Typically, with the potential difference between the input terminals zero, the output current is adjusted to be at its mid-range value, e.g. having a magnitude sufficient to create a drop of 9 volts across the potentiometer 32. As the amplifier output swings through its full range, the drop across the potentiometer varies from 3 to 15 volts. An increase in potential of the amplifier input terminal 24 causes the current flow through potentiometer 32 to increase. The full range of output variation is obtained by a change in input voltage of about one millivolt.

The operation of the FIG. 1 circuitry is as follows: assuming first that the devation signal at terminal 10 is zero, and that all of the circuit potentials are stabilized, an increase in the measurement current through resistor 18 will create a positive deviation signal at terminal 10, and this will tend to raise the potential of amplifier input terminal 24. The output current flowing through potentiometer 32 thus will increase to cause the potential on output terminal 34 to go more negative. Capacitor 48 prevents any immediate change in the potential of amplifier input terminal 52, and the feedback action is represented initially by the effect of feedback resistor 36 on the other input terminal 24.

As an exaggerated example, if the measurement current through resistor 18 increases suddenly by 10 milliamps (e.g. from 30 to 40 milliamps), the potential of deviation terminal 10 would go positive one volt. Assuming now that the potential of the output terminal 34 was −3 volts initially, the one volt increase in the deviation signal will cause the potential of output terminal 34 to shift to a new more negative potential tending to keep the potential of input terminal 24 at its original value. It will be evident that this new potential must be −4 volts; that is, a one volt increase in the deviation signal requires a one volt change in the negative direction of the feedback potential at terminal 34, because with a 2:1 voltage dividing ratio provided by resistors 22 and 36, the potential of input terminal 24 can be held constant only if the potentials at the ends of the voltage divider vary an equal amount and in opposite directions. Of course, it is not possible to hold input terminal 24 exactly to its original potential, because there must be a change in the input voltage between terminals 24 and 52 to produce the increased amplifier output current required to shift the output potential at terminal 34 one volt. However, the amplifier gain is so high that this change in input potential is essentially negligible relative to the change in deviation signal and feedback voltage.

The amplifier 26 includes in its output a control signal circuit 56 which is symbolically indicated in FIG. 1 as a single conductor connected to output lead 28. This circuit is adapted to transmit to a remote process regulating device, such as a valve or the like (not shown), a control signal corresponding to the current through potentiometer 32. In the actual controller detailed in FIGS. 3 and 4, this circuit 56 is somewhat more complex than that shown in FIG. 1, but in essence it acts by a conventional manner to produce an output control signal in the range of 10–50 milliamps, whereas the current flowing through potentiometer 32 is in the range of 5–25 milliamps. Thus, when the deviation signal goes from zero to one volt, the control signal in circuit 56 initially will increase correspondingly.

After the initial change in the potential of the output terminal 34 has been effected, there will be a further and continuing change in the output due to the gradual change in the potential of the other amplifier input terminal 52 resulting from the charging (or discharging) of reset capacitor 48. Specifically, if the potential of output terminal 34 goes from −3 to −4 volts as described above, the potential of intermediate point 44 in the voltage divider 38 will shift from −1.5 volts to −2 volts, and capacitor 48 thus will begin charging up from a voltage level of −1.5 volts towards a level of −2 volts. Such decrease in potential of capacitor 48 in effect increases the voltage difference between the amplifier input terminals 24 and 52 thus tending correspondingly to increase the amplifier output current. This is the reset action required of modern controllers.

Of course, ordinarily the charging of reset capacitor 48 is at a relatively low rate, because of the large time-constant of reset resistor 46 and capacitor 48. This time-constant might be as high as 30 minutes for processes having relatively long time lags. Also, the initial change in the control signal in circuit 56 produces a corresponding change in the setting of the process regulating device, and this in turn causes the controlled process condition to start back to the desired set point. Thus the deviation signal at terminal 10 will correspondingly be reduced, which tends to counteract the increase in control current due to reset action. These various influences in the circuitry interact in a dynamic fashion, and produce as an end result a proper control action effective to stabilize the controlled process condition at the desired level with reasonable speed and minimum overshoot.

The setting of the potentiometer 32 determines the "proportioning band" of the controller, i.e. the magnitude of change of the controller output for a given change in deviation signal. Each change in potential of deviation signal terminal 10 will be matched by an equal and opposite change in potential of output terminal 34, but the corresponding change of current through leads 28 and 30 will depend upon the setting of potentiometer 32.

For many processes, it is desirable also to have in the final control signal a component proportional to the rate-of-change of the measured condition. This is accomplished in the controller described herein by a rate-responsive circuit, generally indicated at 60, the input of which is connected directly across the measurement resistor 18. The rate-sensing elements of this circuit consist of a series capacitor 62 followed by an adjustable shunt resistance 64 (1M), which coact in a known manner to develop across resistance 64 a signal essentially proportional to the rate-of-change of the measurement signal produced by resistor 18. The rate signal is fed to the input of a D-C amplifier 66 having a gain of about five. The output of this amplifier is connected between the reset capacitor 48 and reference lead 20 so that, with shorting switch 54 open, the intensified rate signal from amplifier 66 is injected into the input of the main amplifier 26 in series with the reset feedback signal on capacitor 48.

TRANSFER TO MANUAL

While the controller is operating automatically to regulate the process condition, the value of the control signal at all times is furnished to a memory circuit comprising a memory capacitor 74 suited for holding a charge for relatively long periods of time. Specifically, one plate of this capacitor is connected through section 70c of transfer switch 72 to the lower output lead 30, while the other plate is connected to the upper output lead 28 (itself connected to reference lead 20). To put it another way, capacitor 74 is connected directly across potentiometer 32. Thus capacitor 74 is maintained charged to a level corresponding to the output of the controller, and specifically the potential of its lower plate is held equal to the negative potential at the top of potentiometer 32.

When the transfer switch 72 is shifted to its non-automatic position (referred to herein as the "manual" position), the lower plate of memory capacitor 74 is connected by switch section 70c directly to amplifier input terminal 52. Simultaneously, switch section 70a connects the other input terminal 24 through a feedback lead 80 to amplifier output lead 30 (i.e. the upper end of potentiometer 32). Since at the instant prior to switchover this output lead 30 was at the same potential as the lower plate of memory capacitor 74, it will be clear that at the instant after switchover the two input terminals 24 and 52 will be at essentially the same potential, i.e. the amplifier input voltage will be essentially zero. Thereafter, the input voltage will of course change slightly (e.g. a fraction of a millivolt), due to the feedback action of lead 80 which causes the amplifier output to be held at that value providing a match between the potential of output lead 30 and the potential applied to amplifier input terminal 52 by memory capacitor 74. The amplifier output thus will be maintained essentially constant during and immediately after switchover to "manual" operation, and accordingly the process will not experience any upset due to switching. It should particularly be noted that this result is achieved without requiring any balancing step during the transfer process.

It should also be noted that after switchover and while on "manual" operation, the memory capacitor 74 is connected betwen the output and the input of the amplifier 26. Thus, the feedback action provided by this amplifier tends to hold the capacitor charged to its original level, thereby minimizing drift effects.

To change the output current of the controller, it is only necessary to alter the charge stored on the memory capacitor 74. The feedback action of lead 80 will automaticaly change the output of amplifier 26 correspondingly. In this embodiment of the invention, the capacitor charge is altered by operating the movable arm 76 of a switch 78 to either of two positions 82 or 84.

In position 82, switch 78 connects the amplifier input terminals 24 and 52 to a series circuit consisting of a current-limiting resistor 86 and a D-C voltage source 88. This tends to make terminal 24 more negative, and by feedback action the memory capacitor 74 gradually discharges at a rate determined by the time-constant of the circuit comprising capacitor 74 (2 microfarads) and the current-limting resistor 86 (10M). As long as switch 78 is held in position 82, capacitor 74 will discharge at a substantially constant slow rate, and the output of the controller correspondingly will decrease.

If the switch 78 is shifted to its other position 84, the controller output will increase at a substantially constant slow rate. The output will increase because in this switch position source 90 is connected in the circuit in place of source 88, and source 90 has a reverse polarity with respect to source 88.

When the switch 78 is returned to its neutral (center) position, the voltage sources 88 and 90 are isolated from the amplifier circuitry. Thus, the charging (or discharging) or memory capacitor 74 will immediately cease, and the output of the controller will remain constant at a level reflecting the amount of charge then stored on the capacitor. The feedback action of the amplifier will hold the output closely to its set level and will minimize any drift effects resulting from capacitor leakage.

SWITCHBACK TO AUTOMATIC

During the time the controller is on manual operation section 70b of transfer switch 72 connects the upper plate of reset capacitor 48 directly to the junction between input resistor 22 and feedback resistor 36. Thus in this condition the charge on the reset capacitor continuously reflects the difference betwen the deviation signal (on terminal 10) and the manually-set controller output signal (represented by the potential of output terminal 34. In effect, the reset capacitor serves, while the controller is on manual operation, as a memory device to remember the actual status of the process condition relative to its set point, and the relationship of that status to the actual manually-adjusted output of the controller.

When the transfer switch 72 is returned to its automatic position, there will be at the instant following switchback, essentially no potential difference between the amplifier input terminals 24 and 52, because the circuit points connected to these terminals were, before switchback, connected directly together by transfer switch section 70b. Since the charge on the reset capacitor 48 had, while on manual, been maintained at the proper value reflecting both the deviation signal and the controller output signal, this reset capacitor charge will not cause any immediate change in the amplifier input signal after switchback to automatic operation. Thus switchback will take place without any significant change in the controller output signal. Thereafter, of course, if the measurement and set signals are not equal, i.e., if there is a deviation signal at terminal 10, the controller will operate in the appropriate manner to return the process condition smoothly and rapidly to the desired value.

It may particularly be noted that, with the rate-responsive circuit arrangement 60 of this embodiment of the invention, the transfer back to automatic operation will be smooth even though the shorting switch 54 is open and the process condition is changing at the time of switchback. Under these conditions the changing of the process condition will be reflected by a corresponding rate signal from amplifier 66. However, this rate signal is connected in series with the deviation signal and the reset capacitor 48 both before and after switchback, and thus it has no effect on the input to the main amplifier 26 at the instant of switchback. Thereafter, of course, the rate signal will have its intended effect in providing proper automatic control of the process condition.

DETAILED DESCRIPTION

Referring now to the left-hand side of FIG. 3, the preferred embodiment of the present invention includes set point input terminals 10 and 12a through which the set point current is directed to resistor 16 to produce a corresponding set point voltage signal. This set point signal is coupled through a cascade switch 100 and one section 102a of a conventional reversing switch 104 to the input resistor 22. The other set signal terminal 12a is connected through two other sections 102b and 102c of the reversing switch to the measurement signal resistor 18 which is supplied with a measurement current from terminals 12b and 14. These latter terminals typically will be connected through a two-wire transmission line to a conventional measurement transmitter, such as one arranged to produce a current corresponding to a temperature of the process. The measurement voltage developed across resistor 18 is in series opposition to the set point voltage across resistor 16, so that these resistors and the associated circuitry form a comparison circuit. The difference betwen the two compared voltages represents the "deviation signal" which is proportional to the difference between the measured process condition and the desired value thereof.

The lower end of the comparison circuit defined by resistors 16 and 18 is connected through section 102d of the reversing switch 104 to circuit ground, provided by reference lead 20. The deviation signal at the upper end of the comparison circuit is coupled through input resistor 22 to a conductor 106 leading to input terminal 24 of amplifier 26 (the details of which are shown in FIG. 4). The output current developed by this amplifier flows through output leads 28 and 30 and a filter 112 (in the upper right-hand corner in FIG. 3). The filtered direct current produce a corresponding voltage drop across a series-connected load consisting of a fixed resistor 114 (10 ohms) and the potentiometer 32. The movable arm of potentiometer 32 defines an output terminal 34, and the voltage picked off is directed through feedback resistor 36 to the amplifier input lead 106. The feedback voltage on terminal 34 also is applied across the voltage-dividing network 38 consisting of resistors 40 and 42 (100K each) in series with a trimming potentiometer 116 (10K) the movable arm of which defines the intermediate point 44 of the divider 38. The feedback voltage on point 44 is directed through the series combination of fixed resistor 118 (390K) and the adjustable reset resistor 46 (100M) to the shunt reset capacitor 48 (18 microfarads). The upper plate of this reset capacitor is connected through one section 70b of the manual-to-automatic transfer switch 72 to a lead 124 extending to the other input terminal 52 (FIG. 4) of the amplifier.

The measurement signal developed across resistor 18 also is fed to one input terminal 126 of a rate-responsive circuit generally indicated at 60. The other input terminal 130 of this circuit is connected to the reference lead 20. This circuit has an input comprising the series capacitor 62 (100 microfarads) connected through an on-off switch 134 to shunt resistance 64 consisting of a fixed resistor 138 (2.2K) in series with an adjustable resistor 140 (1M). If the measurement signal across resistor 18 is fixed, i.e. unchanging, there will be no voltage across the shunt resistance 64 because the capacitor 62 will be charged up to the voltage of the measurement signal. However, if the measurement signal is changing, there will be a voltage developed across the shunt resistance 64 proportional to the rate-of-change. The magnitude of this voltage is determined by the RC time-constant of the input circuit elements 62 and 64 and can be altered as desired by the adjustable resistor 140.

The rate-of-change voltage developed across the shunt resistance 64 is applied to amplifier 66 comprising direct-coupled transistors 142 and 144. This amplifier is supplied with operating power over two leads 146 and 148 which are connected to a conventional 43 volt D-C power supply 150 (see FIG. 2). The output of amplifier 66 is biased up to provide a normal (zero-input) output potential on terminal 152 of about 20 volts. This output varies between about zero volts and 40 volts under operating conditions.

To eliminate rate action from the control signal, the on-off switch 134 is placed in its "off" position to connect a resistor 154 (10K) between rate capacitor 62 and reference lead 20. This assures that the capacitor 62 always remains charged to the level of the measurement signal across resistor 18, so that switchback to "on" position can be effected without disturbance to the process. The resistor 154 is provided to prevent deterioration of the controller response speed which otherwise would occur if the rate capacitor were connected directly across the measurement resistor.

To the left-hand end of input resistor 22 is connected a deviation meter 156 to provide an indication of the magnitude of the deviation signal. Since resistors 16 and 18 carry not only the set point and measurement currents but also a small additive current resulting from the feedback signal on terminal 34, it is not possible to get a reading of the deviation signal simply by connecting meter 156 directly across resistors 16 and 18. To compensate for this small additive current, the lower terminal of meter 156 is connected through a resistor 158 (600 ohms) to reference lead 20, and through another resistor 160 (200K) to terminal 34. The resulting voltage drop across resistor 158 exactly compensates for the additive voltage drop across resistors 16 and 18 due to the feedback signal, so that the deviation meter 156 reads only the actual deviation signal.

The upper end of potentiometer 32 is connected through section 70c of transfer switch 72 to one plate of memory capacitor 74 (2 microfarads) the remote plate of which is connected through a stabilizing resistor 164 (100K) to reference lead 20. The energized plate of capacitor 74 also is connected to the selector arm 76 of a 5-position switch 78a. In its normal center position, arm 76 is isolated from the operative switch contacts and thus the voltage of capacitor 74 always will follow exactly the output of amplifier 26 so as to maintain a "memory" of the control signal magnitude for subsequent use when the controller is switched from automatic to manual operation.

When the transfer switch 72 is shifted to "manual" position, section 70a of this switch (see FIG. 4) disconnects lead 106 from amplifier input terminal 24, so that the amplifier input is isolated from the deviation signal. Simultaneously the memory capacitor 74 is connected to the input of the amplifier by section 70c of the transfer switch, for the purpose of fixing the controller output at the level just before switchover to manual. In this regard, since capacitor 74 is charged up to a level corresponding to the controller output, its potential is much too large to be applied directly as the sole input signal to the amplifier because the amplifier would immediately be driven to its limit. Such a result however is prevented by circuit means made operative when transfer switch 72 is shifted to manual position and arranged to compensate for the magnitude of the capacitor voltage so as to cause the amplifier output to be held at its previous level.

In the present embodiment this circuit means consists of a manual feedback lead 80 which is connected by transfer switch section 70a to amplifier input terminal 24 to apply thereto the potential of amplifier output lead 30. Thus, the amplifier output is automatically held at its previous level, because the feedback action of lead 80 causes the amplifier output to be at a level which maintains the potential of output lead 30 equal to the potential of capacitor 74, i.e. at the value which each had prior to switchover. Accordingly the transfer to manual is effected without any upset to the process. Thereafter, the feedback action of amplifier 26 tends to hold the original charge on capacitor 74, so as to minimize any drift effects over a period of time.

To adjust the controller output signal while on "manual" the operator merely shifts the switch 78a to either of two contacts 82 or 84, whereby the switch arm 76 is connected through respective charge-rate limiting resistors 86a and 86b (10M) to positive or negative supply voltages 88 and 90 (e.g. 3 volts), the circuit being completed through a resistor 92 and common terminal 94. Details of the corresponding power supply 168 are shown in FIG. 2. Current from supply voltage 88 or 90 gradually charges (or discharges) the capacitor 74 to a new level, and the output of the controller changes accordingly. To permit a very rapid change in capacitor charge, switch 78 is provided with additional contacts 170 and 172 which lead directly to the positive and negative voltages 88 and 90, without interposition of the charge-rate limiting resistors 86a and 86b.

While the controller is on "manual," section 70b of transfer switch 72 connects the upper plate of reset capacitor 48 to the junction between input resistor 22 and feedback resistor 36. Thus this reset capacitor is maintained charged to a level corresponding to the difference between the deviation signal on terminal 10 (plus the rate signal, if the condition is changing) and the controller output represented by the voltage on terminal 34. In effect the reset capacitor provides a "memory" of the relationship between the status of the process condition and the actual controller output, so as to enable the controller to be switched back to automatic operation at any time without upsetting the process.

When the transfer switch 72 is returned to "automatic" position, switch section 70b reconnects the reset capacitor 48 to the lower amplifier input terminal 52 and switch section 70a reconnects the other input terminal 24 to the junction between resistors 22 and 36. Since the reset capacitor and this junction were connected together just before switchback to automatic, and hence at exactly the same potential, it will be evident that immediately after switchback the two amplifier input terminals also will be at the same potential. Thus, no significant change in controller output signal will be required to achieve a stable condition, so the transfer back to automatic is effected without any process upset.

It may particularly be noted that transfer to automatic operation will be smooth even if the process condition is changing so as to produce a rate-responsive signal at the output of amplifier 66. This is because the output of amplifier 66 is connected in series with the reset capacitor 48 both before and after switchback to automatic operation. Thus the charge on the reset capacitor will be maintained at the level required to provide, at switchback to automatic, essentially zero potential difference between the amplifier input terminals 24 and 52, regardless of any changes occurring in the controlled process condition at the instant of transfer.

After the transfer to automatic has been accomplished, the controller will act in its normal fashion to regulate the controlled process condition. If the condition deviates from the desired set point, the control signal automatically will change so as to reposition the process valve (or other regulating device) in a manner to bring the controlled condition rapidly and smoothly to the desired set point.

The set point current applied to terminals 10 and 12a is developed by a set point generator generally indicated at 200 in FIG. 4. This generator includes a full-wave rectifier 202 the D-C output of which passes through an RC filter 204 to a Zener voltage-regulating diode 206. The voltage fixed by this diode is connected across the main current-carrying circuit of the set point generator, this circuit consisting of a fixed resistor 208, an adjustable "span" resistor 210, the emitter and collector electrodes of the output transistor 212, the set point terminals 10 and 12a, and a fixed resistor 214 (100 ohms) providing a readout voltage for a remote indicator or other control purposes.

The magnitude of the current flowing through the transistor 212 is adjusted by a set point potentiometer 216 the movable arm of which picks off a control voltage for the base electrode of the transistor. This potentiometer is supplied with current by a "zero" adjusting resistor 218 and a fixed resistor 220 which are connected to a second Zener regulating diode 222. This latter diode is energized through a pair of compensating diodes 224 and a fixed resistor 226 connected to the first Zener diode 206. Diode 222 provides a very closely regulated voltage for setting the potential on the transistor base electrode.

One advantage of this set point generator 200 is its ease of calibration relative to comparable circuits available before. To calibrate, set point potentiometer 216 first is placed at its low output position and the zero resistor 218 is adjusted to provide a current output through the transistor 212 of 2 milliamps. Then potentiometer 216 is placed at its high output position and the span resistor 210 is adjusted to provide a transistor output current of 10 milliamps. Readjustment of the zero and span resistors may be necessary in order to reach previous settings of 2 and 10 milliamps, but in any event the entire calibration procedure is quickly accomplished. It may also be noted that with this arrangement the set point potentiometer 216 need not be of the type having a closely controlled resistance, since the calibration adjustments compensate for any inaccuracy in the actual value of resistance. The only requirement is that the change in resistance with changes in potentiometer setting be uniform and consistent.

The cascade switch 100 serves, when actuated, to connect a remotely controllable set point signal to the controller, for example a set point signal derived from the output of a similar controller responsive to a second condition of the process. This remote set point signal is applied to terminals 180 and 182 to cause a corresponding flow of current (e.g. in the range of 10 to 50 milliamps) through a resistor 184 (100 ohms). The resulting voltage signal is applied through a compensating resistor 186 (400 ohms) and the cascade switch 100 to sections 102a and 102b of the reversing switch 104. Accordingly, the set signal developed across resistor 184 is connected in series opposition to the measurement signal developed across resistor 18. The ohmic resistance of resistors 184 and 186 is made equal to that of resistor 16, in order to assure that the deviation meter 156 provides an accurate indication of the value of the deviation signal.

The reversing switch 104 operates in the usual way to reverse the direction of the controller output signal for a given change in either the measurement or set signal. That is, in one position of this switch, an increase in the measurement current will cause the potential of output terminal 34 to go more negative, whereas with the reversing switch in its other position, an increase in measurement current will cause the potential of output terminal 34 to go more positive.

Referring now to FIG. 4, when the controller is on automatic operation, amplifier input signal is directed through conductors 106 and 124 and section 70a of transfer switch 72 to the amplifier input terminals 24 and 52. From there, the input signal passes through a T-filter network 300 and one winding 302 of a transformer 304 to a pair of semiconductor diodes 306 and 308. These diodes, which may actually be transistors connected as diodes, operate in the non-conducting region of their characteristic curve, and provide an electrical capacitance the value of which corresponds to the magnitude of the applied voltage.

The general nature of the operation of the diodes 306 and 308 in controlling the amplifier 26 is explained in U.S. Pat. No. 2,956,234 issued to E. O. Olsen. Briefly, these diodes form part of a variable attenuation network in an oscillating positive feedback circuit around the amplifier 26, and control the amount of attenuation in such a way as to adjust the amplitude of oscillations to a level corresponding to the applied D-C input signal. This capacity-diode arrangement is particularly advantageous because it provides an extremely high input impedance for the amplifier 26, and this in turn furnishes a number of significant benefits in the design and operation of the controller.

The oscillations developed in the amplifier 26 are tuned by a resonant circuit 310, for example to a frequency of 130 kilocycles. The oscillations in this circuit are coupled by the transformer 312 to the input of a two-stage direct-coupled transistor amplifying unit 314. Each of the transistors of this unit is supplied with operating power through respective load resistors 316 and 318 connected to a D-C power lead 320. This lead in turn is connected through a voltage-dropping resistor 322 to the positive terminal 324 of a 65 volt power supply 325 (see FIG. 2) having a negative terminal 326.

The A-C output of amplifying unit 314 is coupled through a capacitor 328 to the input of another two-stage direct-coupled transistor amplifying unit 330. The first transistor of this unit is supplied with D-C power through a load resistor 332, while the second transistor is supplied with power through a load resistor 334 and two series-connected coupling circuits 336 and 338. The first of these circuits 336 includes primary winding 340 of a transformer 342 the secondary winding 344 of which furnishes a signal to a power amplifier stage 346. Coupling circuit 336 includes a tuning capacitor and loading resistor which function in the usual way. The other coupling circuit 338 includes primary winding 348 of a transformer 350 the secondary 352 of which is connected to a pair of positive feedback leads 354. This coupling circuit 338 includes a tuning capacitor and loading resistor, and also includes a pair of reverse-connected diodes 356 which serve to limit the amplitude of the positive feedback signal to provide improved stability characteristics.

Positive feedback leads 354 transmit the A-C feedback signal to winding 358 of transformer 304 in the amplifier input circuit previously described. The other winding 302 of this transformer includes a pair of intermediate taps 360 and 362 leading to a balance adjustment potentiometer 364 the movable arm of which is connected to transformer 312 to complete the A-C input circuit. When there is no signal on the amplifier D-C input terminals 24 and 52, the diodes 306 and 308 will have equal capacitance, and for this condition the potentiometer 364 is adjusted to unbalance the A-C input circuit sufficiently to cause the amplifier to oscillate with an amplitude mid-way between the limits of the design range of amplitude variations. When a D-C input signal is applied to terminals 24 and 52, the capacitance of diodes 306 and 308 will become unbalanced, and the oscillations will increase or decrease in amplitude, depending upon the polarity of the applied D-C input signal.

The power amplifier 346 includes two transistors 366 and 368 the base electrodes of which are connected to respective ends of transformer winding 344 so as to activate the two transistors alternately. The emitters of these transistors are connected to respective ends of a winding 370 of an output transformer 372. The center tap 374 of this winding is connected to the negative output terminal 376 of the controller. The positive output terminal 378 of the controller is connected through an output meter 380 to the power supply terminal 324. The controller load connected between output terminals 376 and 378 may consist of one or several units of various types, and the total ohmic resistance of this load may vary up to about 600 ohms.

The path of the controller output load circuit can be traced from power supply terminal 324 through the output meter 380 and the controller load (not shown), through one or the other of the two halves of transformer winding 370, through transistor 366 or 368, through resistors 382 or 384, and through a series resistor 386 (100 ohms) to the negative power supply terminal 326. Transistors 366 and 368 conduct current alternately in this load circuit and the magnitude of the D-C current flow corresponds to the amplitude of the A-C signal coupled to these transistors by transformer 342.

Experience has indicated the need to limit the magnitude of the controller output current with respect both to its minimum and maximum magnitudes. For some applications, it is desirable to limit the controller output to its normal intended operating range, but for other applications (such as where the controller is being used to provide a cascade set point signal for another controller) it may be desired to limit the controller output to a smaller range, for example, from 25% to 75% of its normal range. Accordingly, the output limiting means should be adjustable. Moreover, it has been found that the limiting means should be arranged to hold the output current, as distinct from the output voltage, within a desired range, because the output load may be anything up to 600 ohms, and voltage limiting would give different results for different loads. These features are provided by the circuit elements now to be described.

Connected in parallel with output transistor 366 and its resistor 382 is another transistor 388 the base of which is held at a fixed (but adjustable) potential by a biasing network 390. This network includes a Zener regulating diode 392 which is energized through a dropping resistor 394 by the power supply terminals 324 and 326. The potential supplied to transistor 388 is such as normally to prevent conduction therethrough. However, if the controller output current falls to a predetermined low limit (e.g., 10 milliamps) where the potential developed by series resistor 386 is less than the potential of the base of transistor 388, this transistor will start to conduct. The current through this transistor by-passes power transistor 366, and supplies to the controller load sufficient current to prevent the total load current from falling below the predetermined lower limit.

For the upper limit, another transistor 396 is connected between the base of power transistor 368 and the negative power supply terminal 326. The base of transistor 396 is furnished with a fixed (but adjustable) potential from network 390. With this arrangement, if the load current through series resistor 386 reaches a predetermined upper limit (such as 50 milliamps) conduction will start through the emitter-collector circuit of transistor 396. This conduction will occur only at alternate peaks of the A-C output signal at transformer 342, and tends to clip these peaks so as to lessen the drive applied to transistor 368. This clipping can be considered as resulting from the effective internal impedance of the transformer 342, for example due to saturation of the transformer, or voltage drop across the internal winding resistance. In any event, the effect is to hold the output load current to the predetermined maximum limit. If desired, the emitter of transistor 396 can be energizd from both ends of transformer winding 344, with suitable diode isolation (not shown) in each lead, in order to provide full-wave operation of transistor 396 and consequent limiting at both output transistors 366 and 368.

The feedback circuitry described with reference to FIG. 3 is energized by the secondary 398 of transformer 372. The A-C signal on this secondary is directed to a full-wave rectifier circuit 400 which furnishes a direct current to the leads 28 and 30 to provide the desired D-C energization of the feedback circuitry. It will be evident that this direct current will correspond in magnitude to the output current through controller terminals 376 and 378.

Although a preferred embodiment of this invention has been described in detail, it is desired to emphasize that this is intended only as illustrative of the invention and not as limiting the scope thereof; modified forms of the invention will be apparent to those skilled in the art.

What is claimed is:

1. Process control apparatus for developing a control signal and operable either by a condition-responsive deviation signal or by an independently variable signal such as a manually-adjustable voltage, said control apparatus comprising: an amplifier having an input and an output; a coupling circuit arranged to receive the deviation signal and including a series impedance element for directing said deviation signal to said amplifier input; feedback means connecting said amplifier output to said amplifier input, said feedback means including a series resistor followed by a shunt capacitor and arranged to develop a feedback signal producing reset action in the output of said amplifier; transfer switch means having first and second positions; said transfer switch means in said first position serving to connect said coupling circuit to said amplifier input to apply thereto a potential corresponding to said deviation signal, said transfer switch means also serving in said first position to connect said feedback means to said amplifier input to produce said reset action in said amplifier output; said switch means serving in said second position to isolate said input circuit from said deviation and feedback signals, said transfer switch means also serving in said second position to connect said coupling circuit impedance element in series with said shunt capacitor to energize said capacitor to a level determined both by said deviation signal, acting through said series impedance element, and by the amplifier output signal acting through said feedback means whereby said capacitor is maintained charged to a level determined by said deviation signal and by said amplifier output signal so that switchback to said first switch position can be effected without significantly disturbing the output of said amplifier.

2. Apparatus as claimed in claim 1, including adjustable signal means; said transfer switch means serving in said first position to isolate said adjustable signal means from the input of said amplifier; said transfer switch means serving in said second position to connect said adjustable signal means to the input of said amplifier so as to set the output thereof in correspondence with the adjusted signal level.

3. Apparatus as claimed in claim 2, wherein said adjustable signal means comprises a memory capacitor; said transfer switch means in said first position serving to connect said memory capacitor to said amplifier output so that the charge on said memory capacitor follows the level of the amplifier output signal, whereby the memory capactor will in said second switch position fix the amplifier output to a level corresponding to that existing prior to switchover to said second position.

4. Apparatus as claimed in claim 3, wherein said transfer switch means in said second position serves to connect to said amplifier input a negative feedback signal equal and opposite to the signal provided to the amplifier input by said memory capacitor, whereby the input voltage fed to said amplifier input at the instant of switchover to said second position is essentially zero thereby to assure that there will be virtually no change in the amplifier output.

5. Process control apparatus operable either in automatic (internal-control) or non-automatic (external-control) mode and comprising:
an amplifier having an input and an output;
a capacitor adapted to hold a charge for a relatively long time;
transfer switch means having first and second conditions for establishing said automatic and non-automatic modes;
said transfer switch means in said first condition serving to couple to said amplifier input a deviation signal representing the difference between a controlled process condition and the desired value thereof;
a function-generating circuit connected to said amplifier when said switch means is in said first condition to produce time-varying effects in the amplifier output signal;
means operable with said transfer switch means in said first condition to connect said capacitor to said amplifier output to be charged to a level corresponding to, and varying with changes in, the output signal;
said transfer switch means in said second condition serving to isolate said deviation signal from influence over said amplifier input and said capacitor;
means operable with said transfer switch means in said second condition to connect said capacitor to said amplifier input to control the amplifier output in accordance with the charge level thereof; and
circuit means operative when said transfer switch means is in said second condition to fix the amplifier input signal at a magnitude producing an amplifier output signal equal to that existing just prior to switchover to said second condition.

6. Apparatus as claimed in claim 5, wherein said circuit means comprises a feedback circuit connected to said input of said amplifier to maintain the input signal at essentially zero at the instant of switchover to non-automatic operation, thereby to hold the amplifier output at its value just preceding switchover.

7. Apparatus as claimed in claim 6, wherein said amplifier includes an output terminal the potential of which corresponds to the output signal produced by the amplifier, said transfer switch means serving in said automatic condition to connect said capacitor to said output terminal to charge said capacitor to a level corresponding to said potential, said switch means serving in said non-automatic condition to connect said output terminal to said amplifier input to apply thereto a feedback signal equal but opposite to the signal from said capacitor, said amplifier output thereby being maintained at the value required to hold said output terminal at the potential it had just preceding switchover to non-automatic operation.

8. Apparatus as claimed in claim 5, including adjustment signal means for providing positive and negative supply voltages for charging and discharging said capacitor while said transfer switch means is in said non-automatic condition; thereby to alter the output signal produced by said amplifier.

9. Apparatus as claimed in claim 8, including manually-operable adjustment switch means having a neutral position and two operating positions; said adjustment switch means in one of said operating positions serving to connect said capacitor to one of said voltages, said adjustment switch means in the other operating position serving to connect said capacitor to the other of said voltages.

10. Apparatus as claimed in claim 5, wherein said capacitor is connected in said non-automatic condition between said amplifier output and said amplifier input to hold the amplifier output substantially constant over a relatively long period of time.

11. Process control apparatus for developing a control signal and operable either by a condition-responsive deviation signal or by an independently variable signal such as a manually-adjustable voltage, said control apparatus comprising: measurement signal means producing a signal corresponding to the measured process condition, set signal means producing a set signal corresponding to the desired level of said process condition, comparison circuit means interconnecting said measurement and set signal means to develop a deviation signal; an amplifier having an input and an output; a coupling circuit for directing said deviation signal to said amplifier input; feedback means connecting said amplifier output to said amplifier input, said feedback means including reset capacitance means developing reset action in the amplifier output; rate-responsive means coupled to said measurement signal means to produce a rate signal corresponding to the rate-of-change of the process condition; transfer switch means having first and second positions; said transfer switch means in said first position serving to connect said coupling circuit to said amplifier input to apply thereto a potential corresponding to said deviation signal, said transfer switch means also serving in said first position to couple said reset capacitance means to said amplifier input in series with said rate signal, to produce both rate and reset action in said amplifier output; said transfer switch means serving in said second position to isolate said input circuit from the deviation and feedback signals, said transfer switch means also serving in said second position to couple said reset capacitance means in series with said rate signal and said deviation signal to maintain said capacitance means charged to a level determined both by said deviation signal and said rate signal, whereby to assure that the amplifier input voltage is essentially zero when said transfer switch means is returned to said first position.

12. Apparatus as claimed in claim 11, wherein said amplifier has first and second input terminals, said feedback means including a series resistor followed by said capacitance means in shunt therewith; said transfer switch means serving in said first position to connect said deviation signal to said first input terminal and to connect said shunt capacitance in series with said rate signal to said second input terminal; said transfer switch means serving in said second position to connect said capacitance means in series with said rate signal and said deviation signal.

13. Apparatus as claimed in claim 12, including a series resistance providing the feedback connection between said amplifier output and said shunt reset capacitance means, said feedback connection serving while said transfer switch means is in said second position to maintain said reset capacitance means charged to a level responsive to the output of said amplifier.

14. An industrial process controller operable either in automatic or non-automatic condition and comprising an amplifier providing an output signal proportional to the input signal, said output signal being adapted for use as a control signal for a process valve or the like;
   capacitor means adapted to store a charge as a memory signal;
   transfer switch means having automatic and non-automatic states;
   said transfer switch means in said automatic state serving to couple to said amplifier input a deviation signal representing the difference between a controlled process condition and the desired value thereof;
   function-generating circuit means coupled to said amplifier by said transfer switch means in said automatic state to develop reset action in the output signal;
   means operable when said transfer switch means is in said automatic state to maintain in said capacitor a charge-level corresponding to the magnitude of said output signal;
   said transfer switch means in said non-automatic state serving to isolate said deviation signal from effective influence over the output of said amplifier and from effective influence over the charge stored in said capacitor;
   circuit means serving, when said transfer switch means is in said non-automatic state, to direct to said amplified input a signal corresponding to the charge which was stored in said capacitor at the end of automatic operation, thereby to control the amplifier output in accordance with said charge level, said circuit means including means operable to fix the input signal at a value to produce an amplifier output signal effectively equal to that existing just prior to switchover to non-automatic state.

15. Apparatus as claimed in claim 14, wherein said circuit means comprises negative feedback means to apply to the amplifier input a feedback signal resulting in an essentially zero input signal level at the instant of switchover.

16. Apparatus as claimed in claim 15, including auxiliary means operable with said switch means in non-automatic state for slowly varying the level of the charge in said memory capacitor so as correspondingly to alter the output signal of said amplifier.

17. Apparatus as claimed in claim 16, wherein said auxiliary means comprises means for directing a low-level flow of current to said capacitor.

18. An industrial process controller operable either in automatic or non-automatic condition and comprising an amplifier providing a D-C output signal proportional to its input signal; electronic memory means responsive to an applied D-C electrical signal and arranged to store a corresponding electrical quantity such that a D-C memory signal equal to the applied signal is available after removal of the applied signal; transfer switch means having automatic and non-automatic states; said transfer switch means in said automatic state serving to couple to said amplifier input a D-C deviation signal representing the difference between a controlled process condition and the desired value thereof, said transfer switch means in said automatic state also serving to apply to said memory means a D-C signal corresponding to said output signal, whereby when said transfer switch means is shifted to non-automatic state said memory means will retain in storage an electrical quantity corresponding to said amplifier output signal at the time of switchover; said transfer switch means in said non-automatic state serving to isolate said deviation signal from effective influence over said amplifier and from effective influence over the electrical quantity stored in said memory means, said transfer switch means further serving in said non-automatic state to connect said memory means between the output and input of said amplifier to direct to said amplifier input a signal corresponding to the amplifier output signal at the end of automatic operation, thereby to control the amplifier output in accordance with said electrical quantity; and negative feedback circuit means coupled between said amplifier output and said amplifier input with said switch means in non-automatic state for setting the amplifier input signal initially at zero so as to maintain the amplifier output signal essentially equal to that existing just prior to switchover to non-automatic state.

19. Apparatus as claimed in claim 18, wherein said amplifier comprises first and second input terminals, said switch means serving when in non-automatic state to connect said memory means to one of said terminals and the negative feedback circuit to the other terminal.

20. Apparatus as claimed in claim 18, wherein said memory means comprises a storage capacitor.

21. Apparatus as claimed in claim 20, including manually-operable means for directing to said storage capacitor a low-level flow of current, in either direction, so as to permit changing the capacitor voltage to any desired level and thereby correspondingly alter the amplifier output signal.

22. An industrial process controller operable either in automatic or non-automatic condition and comprising an amplifier providing an output signal proportional to the input signal, said output signal being adapted for use as a control signal for a process valve or the like; function-generating means operable with said amplifier to produce time-varying effects in the controller output signal when in automatic condition; transfer switch means having automatic and non-automatic states; said transfer switch means in said automatic state serving to couple to said amplifier input a deviation signal representing the difference between a controlled process condition and the desired value thereof; a storage capacitor; circuit means operable when said transfer switch means is in non-automatic state to connect said capacitor between the output and input of said amplifier as a negative feedback circuit; said transfer switch means in said non-automatic state serving to isolate said deviation signal from effective influence over said amplifier and said capacitor; current-producing means arranged to produce current signals of relatively low intensity; and switch means connected to said current-producing means to direct the current signals thereof to said storage capacitor selectively in positive or negative direction, thereby to alter the charge on said capacitor slowly and smoothly to any desired value so as to correspondingly vary the control signal for the process valve.

23. Apparatus as claimed in claim 14, including a rate circuit for producing a rate signal corresponding to the rate-of-change of the process condition, the input of the rate circuit being arranged to receive directly a measurement signal representing the magnitude of the controlled process condition so as to produce a rate signal which is independent of changes in the set point of the controller; and means coupling said rate signal to the input of said amplifier.

24. Apparatus as claimed in claim 23, wherein said rate circuit includes an amplifier to produce an intensified rate signal.

25. Apparatus as claimed in claim 24, wherein said rate circuit includes a resistor and a capacitor connected in the input circuit of the rate amplifier to develop the rate signal.

26. Apparatus as claimed in claim 23, including a reset capacitor arranged to receive a feedback signal from the amplifier output; said transfer means serving in non-automatic condition to direct to said reset capacitor a composite signal including (1) the deviation signal, (2) the rate signal and (3) a feedback signal from the amplifier output.

27. Industrial process control apparatus operable either in automatic (internal-control) or non-automatic (external-control) mode and comprising:
  an amplifier providing an output signal adapted for use as a control signal for a process valve or the like;
  first and second capacitors arranged to store corresponding charges;
  means to develop a deviation signal representing the difference between a measurement signal and a set point value;
  transfer switch means having automatic and non-automatic states;
  said transfer switch means in said automatic state serving to couple said deviation signal to said amplifier input;
  means operable in said automatic state to store in said first capacitor a charge corresponding to said output signal;
  said transfer switch means in said nonautomatic state serving to isolate said deviation signal from effective influence over the output of said amplifier and from effective influence over said first capacitor;
  means operable in non-automatic state to store in said second capacitor a charge the level of which varies with changes in said deviation signal; and
  means operable in non-automatic state to direct to said amplifier input a signal corresponding to the charge stored in said first capacitor, thereby to control the amplifier output in accordance with the charge stored in said capacitor.

28. Apparatus as claimed in claim 27, including means operable in automatic state to direct to said amplifier input a signal including as one component the charge level stored in said second capacitor to produce an amplifier output which remains essentially constant at the instant of switchover to automatic state.

29. Apparatus as claimed in claim 28, including means operable in automatic state to connect one of said capacitors in a function-generating feedback circuit for said amplifier, to provide reset action in the amplifier output signal.

References Cited
UNITED STATES PATENTS

| | | | |
|---|---|---|---|
| 2,956,234 | 10/1960 | Olsen | 330—10 |
| 3,467,874 | 9/1969 | Richardson et al. | 330—10 |
| 3,246,250 | 4/1966 | Nazareth, Jr. | 330—10 |
| 3,381,231 | 4/1968 | Gilbert | 328—127 |

DONALD D. FORRER, Primary Examiner

B. P. DAVIS, Assistant Examiner

U.S. Cl. X.R.

307—231, 237, 308; 328—150; 330—30

UNITED STATES PATENT OFFICE
CERTIFICATE OF CORRECTION

Patent No. 3,550,014　　　　　　　　Dated December 22, 1970

Inventor(s) David A. Richardson and Everett O. Olsen

It is certified that error appears in the above-identified patent and that said Letters Patent are hereby corrected as shown below:

In the Drawings:

Sheet 1, line 3　　　Delete "Originally Filed Sept. 12, 1968"
　　　　　　　　　　Insert --Originally Filed Nov. 15, 1965--

Sheet 2, line 3　　　Delete "Originally Filed Sept. 12, 1968"
　　　　　　　　　　Insert --Originally Filed Nov. 15, 1965--

Sheet 3, line 3　　　Delete "Originally Filed Sept. 12, 1968"
　　　　　　　　　　Insert --Originally Filed Nov. 15, 1965--

Column 1, line 8　　After "1968" insert --, which is a conti tion of Ser. No. 507,780, filed Nov. 15, 1965--

Signed and Sealed this twentieth Day of April 1976

[SEAL]

Attest:

RUTH C. MASON
Attesting Officer

C. MARSHALL DANN
Commissioner of Patents and Trademarks